Dec. 15, 1959  V. N. ALBERTSON ET AL  2,916,926
VARIABLE SPEED BELT DRIVE
Filed Dec. 6, 1956  3 Sheets-Sheet 1
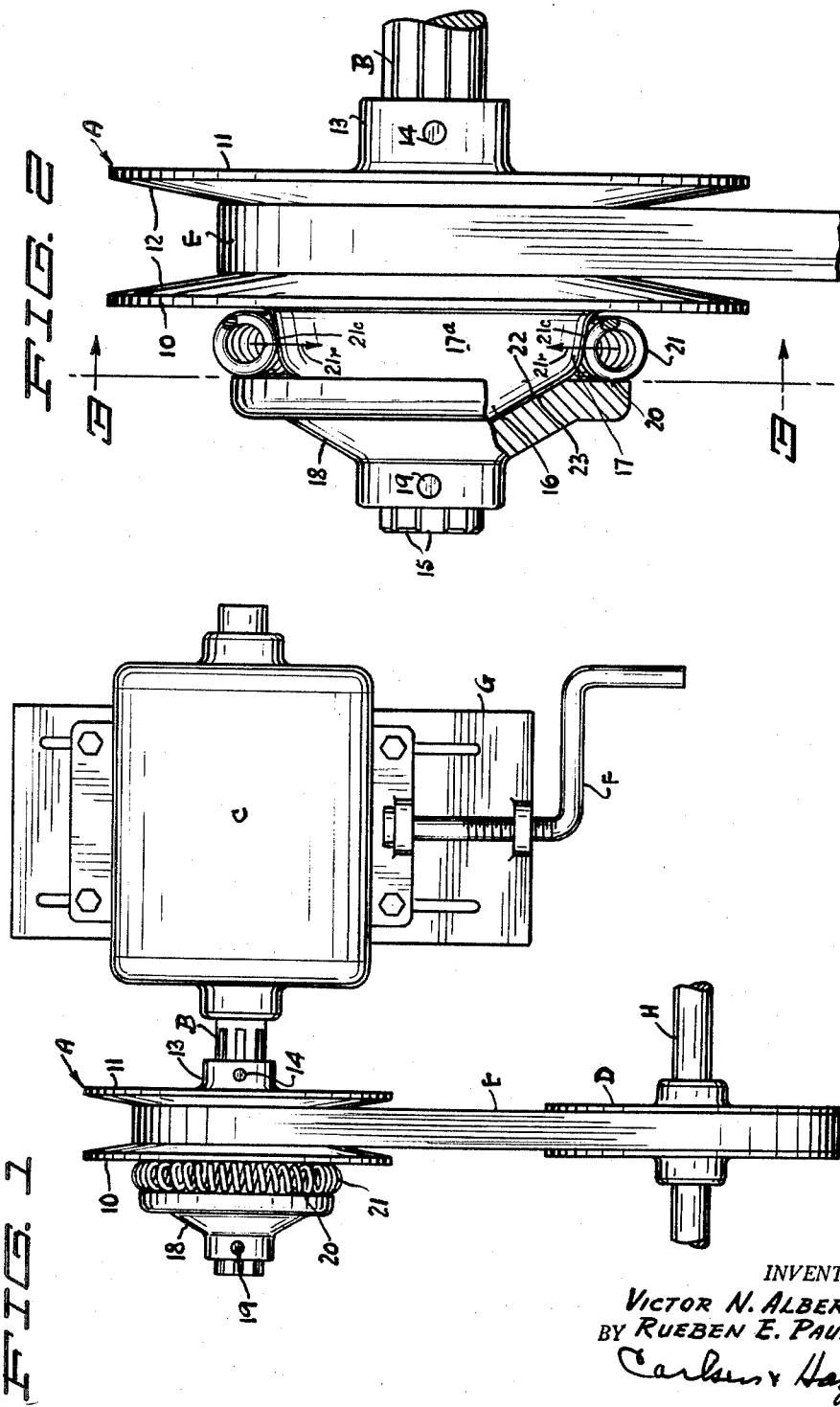
INVENTOR.
VICTOR N. ALBERTSON
BY RUEBEN E. PAULSON
ATTORNEYS

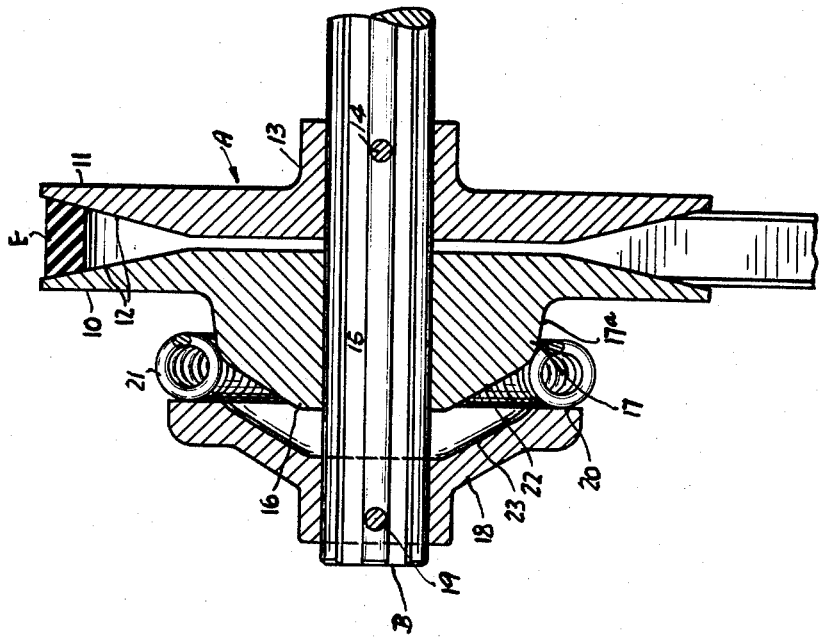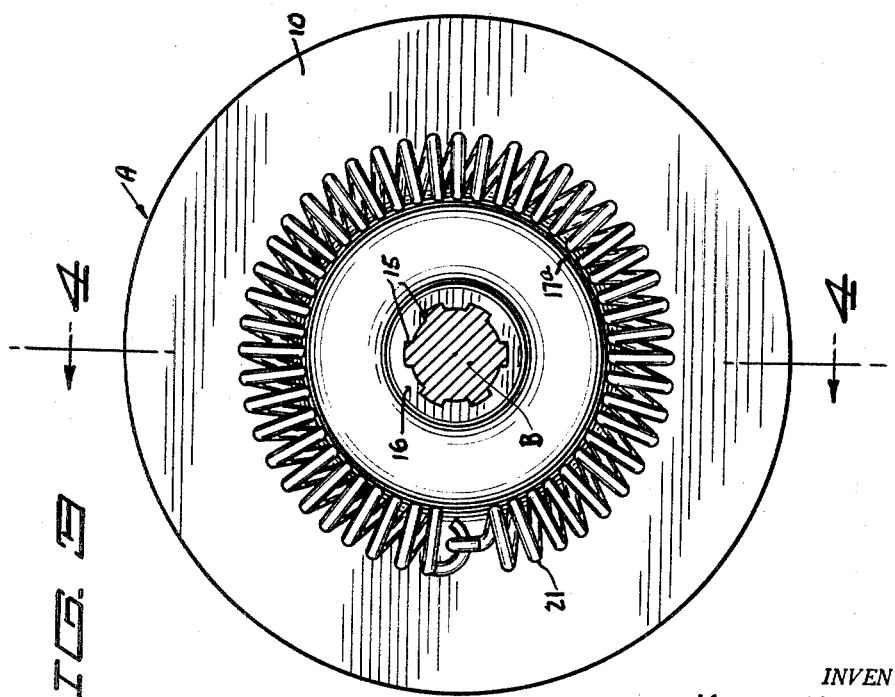

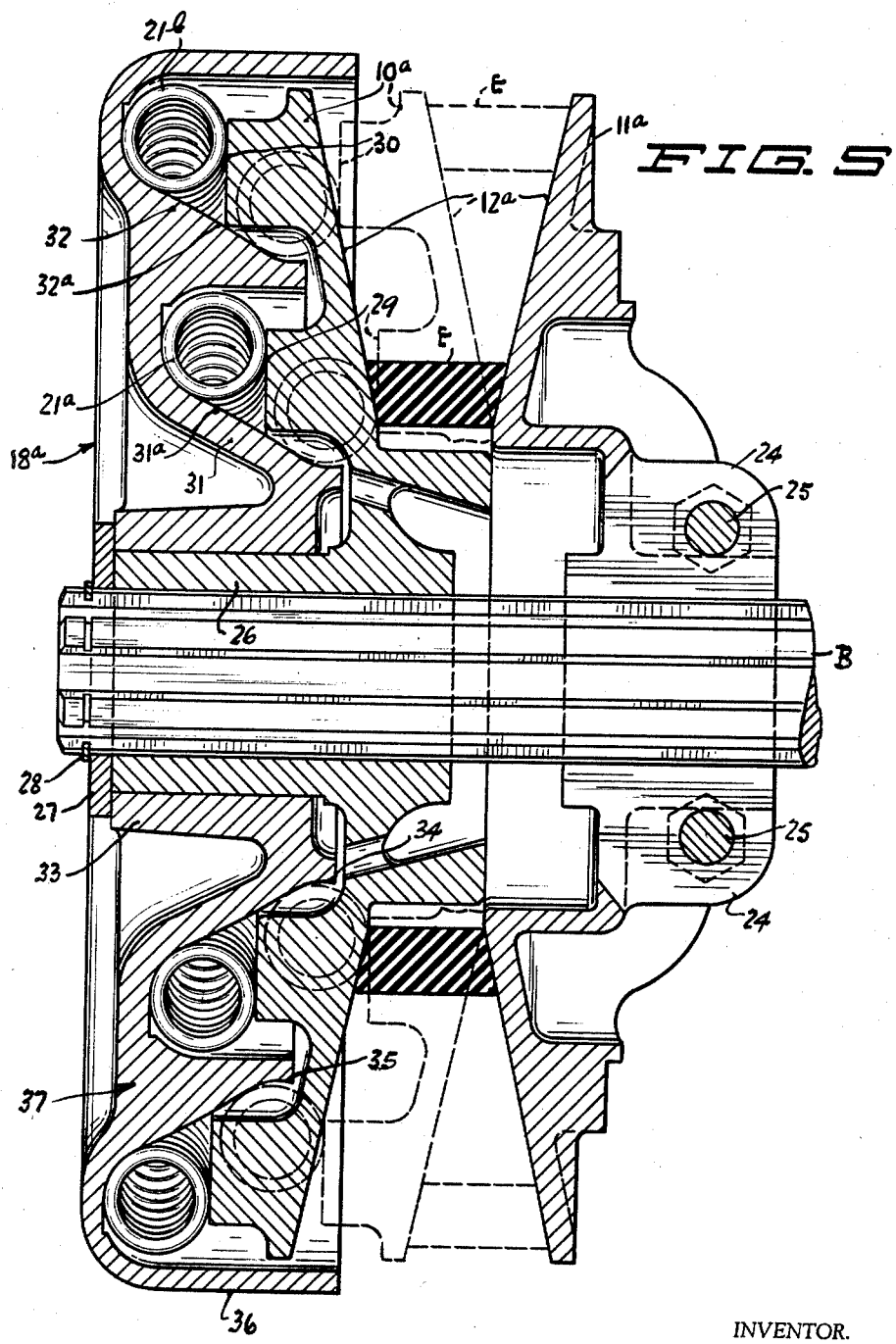

United States Patent Office 2,916,926
Patented Dec. 15, 1959

2,916,926

VARIABLE SPEED BELT DRIVE

Victor N. Albertson and Rueben E. Paulson, Minneapolis, Minn., assignors to Minneapolis-Moline Company, Hopkins, Minn., a corporation of Minnesota Application December 6, 1956, Serial No. 626,770

10 Claims. (Cl. 74—230.17)

This invention relates to improvements in variable speed belt drives, or what is commonly called variable speed pulleys, wherein the effective belt groove diameter is controlled by relative axial movement of the two pulley sides or belt groove forming members toward and away from each other.

Such pulleys or sheaves are in wide usage today and provide a relatively simple means for obtaining varying belt speeds of infinite magnitudes between predetermined high and low speeds. As commonly constructed such pulleys embody trunco-conical pulley members, or sides, rotationally stationarily mounted upon a rotating carrier or shaft, with a least one of said members axially shiftable with respect to the other to vary the intervening belt groove diameter. That is, when the pulley is opened or these members are spread apart the belt groove diameter decreases, and vice versa. It is also common to provide one or more expansion coil springs braced against the axially shiftable member, or members, not only to normally close the pulley, or adjust the same toward the condition of largest belt groove diameter, but also to maintain effective lateral pressure on the belt so as to drive the same. The pulley is often controlled by varying the tension on the belt, or by in one way or another reversely controlling the effective belt groove diameter of another pulley engaging the belt, amounting in a sense to the same thing. It is well known, however, that the closing springs as now arranged on such pulleys are not satisfactory in that the effective spring rate is determined by the characteristics of the springs alone and uneven spring pressures are brought to bear which may result in belt slippage at one condition of the pulley and undue lateral pressure on the belt at another condition, which causes excessive wear on the belt and makes the adjustment of the pulley difficult. For example, if an ordinary expansion coil spring is braced against the movable side of the pulley, to exert closing pressure thereon parallel with the axis of rotation, then to establish effective driving contact with the belt, with the pulley closed to its largest belt groove diameter, this spring obviously must bear with at least some force on the movable side. As the pulley is then opened up to decrease the effective belt groove diameter the movable side of the pulley must compress the spring and the rate of resistance of the spring to this movement rises very rapidly, finally exerting far more than a desirable pressure on the belt and interfering with the adjustment of the pulley.

It is the primary object of our invention to provide a new and advantageous closing spring arrangement for these pulleys in which the spring rate is controlled by the action of a cam formed on or cooperating with the movable side or member of the pulley, in such fashion that a substantially constant spring action is brought to bear in all positions of the pulley, providing for a desirable and adequate driving contact with the belt under all conditions, and the minimum of interference with adjustment of the pulley. It is only necessary to properly contour the cam to provide any desirable spring rate or action. Another object is to provide a variable belt groove diameter pulley having trunco-conical sides or belt groove forming members mounted to rotate with a rotating carrier or shaft, with at least one of said members also arranged for axial shifting, or opening and closing, movements with respect to the other to vary the intervening belt groove diameter. Also mounted on the carrier is a reaction or stop element and this reaction member or element and the movable pulley member are provided with cooperating cam and reaction surfaces engaged by at least one circumferentially retractile spring element which provides a component of axial thrust on the pulley member determined by the characteristics of the cam surface, or surfaces. In practice the cam surface (or surfaces) varies in diameter in an axial direction and the spring element is stretched around the surface so that it is then only necessary to properly contour the cam for a given spring to obtain a substantially constant spring rate to act upon the pulley. A further object is to provide a pulley of this character embodying a spring and cam arrangement according to our invention which lends itself to use of a single spring and cam or multiple springs and cams, where heavier loads are present, with equal facility and with the same advantages in properly controlled spring rates.

These and other more detailed and specific objects will be disclosed in the course of the following specification, reference being had to the accompanying drawings, in which—

Fig. 1 is an elevation showing a variable belt groove diameter pulley according to our invention as mounted upon the shaft of a motor and driving a second pulley by means of a connecting belt.

Fig. 2 is an enlarged elevation of the variable belt groove diameter pulley, partially in section, and showing only a portion of the shaft upon which the pulley is mounted.

Fig. 3 is a sectional view taken along the line 3—3 in Fig. 2.

Fig. 4 is a diametrical sectional view along the line 4—4 in Fig. 3 and showing the pulley adjusted to its maximum belt groove diameter.

Fig. 5 is a similar sectional view showing a modified version of the pulley and illustrating the same as adjusted to its minimum belt groove diameter, but showing in dotted lines the adjustment to maximum belt groove diameter.

Referring now more particularly and by reference characters to the drawing, in Fig. 1 we illustrate at A a variable belt groove diameter pulley according to our invention as mounted upon the shaft B of a motor C and driving a second pulley D by means of a connecting belt E, such as a common V-belt. It is, of course, well known in the art to provide such a pulley as that shown at A which consists of relatively axially movable and truncoconical sides or belt groove forming members 10 and 11 which, as they are spread apart, or as the pulley is opened, reduce the effective belt groove diameter in order to vary the speed at which the belt E and the pulley D are driven. Conversely, as the members 10 and 11 are brought together in closing the pulley the belt groove diameter is increased and it is common in the art to so adjust the members 10 and 11 by varying the tension of the belt E as, for example, by means of a crank F which moves the motor C upon a mounting base G as is clearly shown. In such an arrangement the pulleys A and D, the latter on a shaft H, are mounted upon axes of rotation the spacing between which is variable. It is also common to adjust the pulley D as to its effective belt groove diameter in consonance with adjustments made of the pulley A, in which case the pulleys operate upon axes of rotation the spacing between which is fixed, but since such arrangements are well known in the art we have here chosen the simpler disclosure of the variable spacing between the pulleys, in order to vary the tension upon the belt E and so adjust the effective belt groove diameter of the pulley A.

As has been stated heretofore it has been the practice to provide one or more expansion springs for resisting the spreading movement of the members 10 and 11, with such springs arranged on axes parallel with the axis of the shaft B carrying the pulley. It is, of course, necessary to provide some lateral presure upon the belt E in order for the pulley A to maintain driving contact therewith and thus such springs have had to be placed under tension in the closed or maximum belt groove diameter adjustment of the pulley. It follows that as the members 10 and 11 are spread apart the spring resistance builds up very rapidly to the point where it results in far more than the necessary lateral driving pressure upon the belt, so that wear is increased and the ease of adjustment of the pulley between its various positions is hindered. What is needed is a closing spring arrangement for such pulleys which will bring a predetermined and substantially even spring pressure to bear to close the members 10 and 11, in all adjusted conditions thereof, and it is to this end that our invention is directed.

At this point it may be noted that in some such pulley installations both of the members 10 and 11 are axially shiftable with respect to each other, and while in this disclosure only the member 10 is shown as arranged for such movement it is to be understood that the double-acting type of pulley may also be equipped with the closing springs, cams, etc., according to our invention without departing from the scope thereof.

As stated the members 10 and 11 are of trunco-conical shape, thus providing inwardly converging, belt engaging surfaces 12, and the member 11 is provided with a hub 13 which is splined upon the shaft B and is also pinned or otherwise suitably secured thereto at 14 to prevent relative axial displacement as between this member of the pulley and the shaft. The other pulley member 10 is engaged with the splines 15 on the shaft B to rotate therewith but to slide axially thereon, toward and away from the member 11, to thereby vary the effective intervening belt groove diameter. This member 10 also has a hub portion 16 and it is larger in diameter than the hub 13 to provide a cam 17 having an annular cam surface 17$^a$ projecting from the face of the member opposite that which engages the belt E. This cam surface 17$^a$ varies in diameter in an axial direction and as it is here shown it decreases in diameter as it leaves the outer face of the member 10 as is clearly shown.

Secured to the shaft B, on the side of the pulley which carries the cam 17, is a stop member or reaction element 18 held in place by a pin 19 or other suitable fastening so that it cannot move in an axial direction on the shaft. This member 18 is provided with an annular abutment 20 facing the pulley member 10 and bearing against this abutment is an annular, circumferentially retractile and elastic pulley closing element which is designated generally at 21. As here shown this element 21 takes the form of a circular retractile coil spring the normal diameter of which is smaller than the smallest diameter of the cam surface 17$^a$ so that when the spring is applied to said cam surface it must be stretched therearound. It follows then that the spring or element 21, as it bears against the abutment 20, will exert a component of axial thrust upon the pulley member 10 tending to urge this member toward the pulley member 11 and thus bias the pulley toward its closed or maximum belt groove diameter position of Fig. 4. In this condition the pulley member 10 will be moved away from the member 18 and the spring 21 will rest against the minimum diameter end portion of the cam surface 17$^a$, as is also clearly shown in Fig. 4.

Note that spring 21 substantially forms a torus about the axis of rotation of shaft B. When spring 21 which may be termed a toroidal spring is stretched there is a tendency on the part of said spring to shrink the size of the torus to the spring's normal or unstretched condition. When such a stretched spring is disposed about and bearing on cam surface 17$^a$ the forces resulting from the tendency of the spring to resume its unstretched state are inwardly directed and aligned along the radii of the spring 21, such forces being designated as by arrows 21$^r$. Inwardly directed forces 21$^r$ are disposed with respect to the circular contact 21$^c$ formed between spring 21 and surface 17$^a$ toward the smaller diameter portion of surface 17$^a$ such as toward hub 16. Being so disposed forces 21$^r$ form a moment of rotation about circular contact 21$^c$ thus urging toroidal spring 21 to roll on surface 17$^a$. Thus spring 21 is constantly urging itself between cam surface 17$^a$ and member 18.

To then open up the pulley, toward its condition of minimum belt groove diameter, the cam 17 must move toward the stop or reaction element 18 and in so doing the spring 21 must roll on the cam surface 17$^a$, toward the largest diameter portion thereof, until it reaches the position seen in Fig. 2. Thus the spring must be stretched and will maintain the component of thrust on the pulley member 10 in the direction of the member 11. The magnitude of this component of thrust thus exerted by the spring 21 is not only determined by the characteristics of the spring itself but also by the contour of the cam surface 17$^a$ and the latter may be so proportioned, as to its increasing and decreasing diameter and its curvature between its maximum and minimum diameter ends, that the spring rate will remain substantially constant, maintaining adequate driving pressure upon the belt E in all conditions of the pulley without introducing the relatively much too great spring forces which are prevalent with the more usual spring arrangements heretofore described.

As is best seen in Fig. 4 the hub portion 16 of the pulley member 10 has a trunco-conical end 22 which will engage a similarly shaped hollow portion 23 of the element 18 to limit movement of the member 10 away from the member 11. This configuration of the end 22 of the hub also facilitates assembly of the pulley, enabling the spring 21 to be rolled up onto the cam surface 17$^a$ without difficulty as the pulley components are moved endwise into their relative operating positions, as will be understood.

The pulley as just described is extremely practical for many applications, but it may be desirable for heavy-duty operation to provide a plurality of the closing springs in order to obtain adequate driving contact with the belt without springs which are too heavy, and while maintaining the desirable substantially uniform spring rate in all conditions of the pulley. In Fig. 5 we show a modification of our invention which embodies two of the circumferentially retractile and elastic closing springs or elements, which are designated at 21$^a$ and 21$^b$, with the latter larger in overall diameter than the former. In this case the pulley members 10$^a$ and 11$^a$ are again mounted upon a carrier such as the shaft B with the member 11$^a$ secured to the shaft against axial displacement and also splined thereupon as has heretofore been described. In this case, however, the hub 13$^a$ is split and is provided with apertured lugs 24 receiving clamp bolts 25 by which this part of the pulley is secured on the shaft. The pulley members 10$^a$ and 11$^a$ have the same general trunco-conical shape providing inwardly converging belt grooves forming surfaces 12$^a$ in which the belt E may run. The pulley member 10$^a$ has a hub 26 of elongated and tubular shape which is splined upon the shaft B so that this pulley member must rotate with the shaft but may move axially with respect thereto. Movement of the member 10$^a$ away from the member 11$^a$ is, however, limited by the contact of the end of the hub 26 with a stop collar 27 held in place upon the shaft B by means of a snap ring 28. This collar is larger in external diameter than the hub 26 as clearly seen. Also in this modification the pulley member 10ª is provided with inner and outer, outwardly projecting, annular abutments 29 and 30 which bear against the aforesaid spring elements 21ª—21ᵇ and these spring elements are disposed upon inner and outer cams 31 and 32 having the cam surfaces 31ª and 32ª which are formed as part of a reaction or stop member corresponding in function to the element 18 aforesaid, being accordingly designated generally at 18ª. In this case, however, this element 18ª is provided with a center hub 33 which is relatively rotatably mounted upon the hub 26 of the pulley member 10ª and which bears also against the stop ring 27. The cam surfaces 31ª and 32ª decrease in diameter in the direction of the pulley member 10ª and with the springs or spring elements 21ª—21ᵇ stretched around these cam surfaces the springs exert a component of endwise thrust against the abutments 29—30 such as to tend to force the pulley member 10ª toward the pulley member 11ª and thus maintain driving contact with the belt E, as well as exert closing pressure tending to adjust the pulley toward its maximum belt groove diameter condition. Here again the amount of such endwise or axial thrust effective upon the belt groove forming member 10ª is a function not only of the characteristic of the springs 21ª—21ᵇ but also of the size and contour of the cam surfaces 31ª and 32ª and the latter may be predetermined as to their contour so as to maintain a substantially even spring rate in all adjusted conditions of the pulley. In addition, because there are two of such springs 21ª—21ᵇ a greater driving contact may be maintained upon the belt in all conditions of the pulley so as to handle heavier loads.

The hub 33 bears outward against the stop collar 27 under influence of the springs 21ª—21ᵇ, and it will be evident also that the member 18ª will rotate with pulley member 10ª even though it (the member 18ª) is not in this case secured to the shaft B.

It will also be understood that the use of the inner and outer springs 21ª—21ᵇ provides spring loading against the pulley member 10ª at two inner and outer points which coincide substantially with the position of the belt E in its minimum and maximum belt groove diameter conditions of the pulley. This is a point of some importance, particularly in heavy-duty applications, in that a tendency of the member 10ª to be rocked or canted, with a sort of lever action, with respect to the shaft B is overcome, with a resulting reduction in wear between the hub 26 and the shaft.

It will be noted that both of the cam surfaces 31ª and 32ª terminate at their minimum diameter ends in substantially cylindrical lips 34 and 35 and the purpose of this configuration of these surfaces is to facilitate assembly of the pulley by providing points at which the springs 21ª—21ᵇ may be rested without any tendency to roll off the cam surfaces until the pulley parts may be assembled in an endwise direction. In addition the element 18a is provided with an outer, substantially cylindrical shroud 36 projecting over the outer periphery of the pulley member 10ª when the latter is fully moved away from the member 11ª, and the purpose is to provide an enclosure for the springs 21ª—21ᵇ so that should they break they will not fly off of the pulley and be a menace to the safety of the operator of the machine with which the pulley is associated. It will be obvious that a shroud such as that here shown at 36 might also be provided upon the stop element 18 of the pulley, as seen in Figs. 1 through 4, for the same purpose.

The abutments 29—30 are of sufficient face area, as measured radially of the pulley, to maintain contact with the springs 21ª—21ᵇ in all positions of the pulley, thus allowing these springs to roll inwardly and outwardly along the cam surface 31ª and 32ª and the abutments and the cam surfaces are relatively offset in an axial direction in order to compensate for the trunco-conical shape of the pulley member 10ª, as is also clearly seen in Fig. 5.

The pulley must for high speed and heavy load applications to be balanced and the shape of the member 18ª is such as to lend itself to the removal of metal for this purpose at the point designated at 37 for this purpose.

The springs 21, 21ª and 21ᵇ may be made up of ordinary coiled, retractile springs of suitable length formed into a circle and hooked together at their ends as clearly shown in Fig. 3. Or any other suitable means may be used for holding the ends of the springs together and in any case the springs when so made are in effect endless, as will be understood.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a power transmitting mechanism including rotatable driving and driven grooved pulleys and a belt connecting the same, at least one of said pulleys being of variable belt groove diameter and comprising two opposed belt groove forming members, one of said members being movable on the axis of rotation toward and away from the other of said members to thereby vary the effective belt groove diameter between the members, a third member adjacent said movable belt groove forming member, means forming a circular cam surface of varying diameter but circumferentially uninterrupted and operatively connected for rotation with said movable member, and means including an annular and circumferentially retractile and elastic member forming a torus operatively engaging said third member and stretched around said cam surface on a line of contact therewith to yieldably oppose movement of the movable belt groove forming member away from the other of said belt groove forming members, said line of contact being axially displaced from the center of the torus formed by the elastic member and forming an axially movable circular axis of rotation on the cam surface of said retractile member.

2. A variable belt groove diameter pulley for a rotating carrier, comprising cooperating belt groove forming members for mounting on said carrier, one of said members being movable axially along the carrier with respect to the other member to thereby vary the effective belt groove diameter between the members, a stop member on the carrier and spaced from the said movable member, a pair of cams of varying diameter on the stop member, said movable member having reaction surfaces adjacent said cams, and a pair of annular retractile coil springs stretched around said cams and bearing against said reaction surfaces to yieldably resist movement of said movable member away from the other of said members.

3. A variable belt groove diameter pulley for mounting upon a rotating carrier, comprising a pair of truncoconical pulley members defining an intervening belt groove, one of said members being secured to the carrier and the other member being axially movable but relatively non-rotatably mounted thereon to thereby vary the effective belt groove diameter between the members, said movable pulley member having inner and outer coaxial and annular abutments, a third member on the carrier, said third member having at least inner and outer circular cam surfaces extending toward said abutments, and inner and outer circular retractile coil springs stretched around said cam surfaces and bearing against said abutments to oppose movement of the movable pulley member away from the pulley member secured to said carrier.

4. A variable belt groove diameter pulley for mounting upon a rotating carrier, comprising a pair of truncoconical pulley members defining an intervening belt groove, one of said members being secured to the carrier and the other member being axially movable but relatively non-rotatably mounted thereon to thereby vary the effective belt groove diameter between the members, said movable pulley member having inner and outer coaxial and annular abutments, a third member on the carrier, said third member having at least inner and outer circular cam surfaces extending toward said abutments, inner and outer circular retractile coil springs stretched around said cam surfaces and bearing against said abutments to oppose movement of the movable pulley member away from the pulley member secured to said carrier, and said third member having a shroud portion outward of and enclosing said springs.

5. A variable belt groove diameter pulley for mounting upon a rotating carrier, comprising a pair of trunco-conical pulley members defining an intervening belt groove, one of said members being secured to the carrier and the other member being axially movable but relatively non-rotatably mounted thereon to thereby vary the effective belt groove diameter between the members, said movable pulley member having inner and outer coaxial and annular abutments, a third member on the carrier, said third member having at least inner and outer circular cam surfaces extending toward said abutments, inner and outer circular retractile coil springs stretched around said cam surfaces and bearing against said abutments to oppose movement of the movable pulley member away from the pulley member secured to said carrier, means rotatably mounting said third member on the movable pulley member, and means restricting said third member from axial displacement by the reaction of the springs and relative to the axis of the carrier.

6. A variable belt groove diameter pulley for mounting upon a rotating carrier, comprising a pair of trunco-conical pulley members defining an intervening belt groove, one of said members being secured to the carrier and the other member being axially movable but relatively non-rotatably mounted thereon to thereby vary the effective belt groove diameter between the members, said movable pulley member having inner and outer coaxial and circular abutments, a third member on the carrier and said third member having at least inner and outer circular cam surfaces extending toward said abutments, inner and outer circular retractile coil springs stretched around said inner and outer cam surfaces respectively and bearing against said abutments to oppose movement of the movable pulley member away from the pulley member secured to said carrier, and said cam surfaces each varying in diameter in a longitudinal direction.

7. A variable belt groove diameter pulley for mounting upon a rotating carrier, comprising a pair of trunco-conical pulley members defining an intervening belt groove, one of said members being secured to the carrier and the other member being axially movable but relatively non-rotatably mounted thereon to thereby vary the effective belt groove diameter between the members, said movable pulley member having inner and outer coaxial and circular abutments, a third member on the carrier and said third member having at least inner and outer circular cam surfaces extending toward said abutments, inner and outer circular retractile coil springs stretched around said inner and outer cam surfaces respectively and bearing against said abutments to oppose movement of the movable pulley member away from the pulley member secured to said carrier, and said cam surfaces each varying in diameter in a longitudinal direction and terminating in cylindrical lip portions adjacent said abutments.

8. A variable belt groove diameter pulley for a rotating shaft, comprising cooperating belt groove forming members for mounting on said shaft, one of said members being movable axially along the shaft with respect to the other member to thereby vary the effective belt groove diameter between the members, a stop member on the shaft and spaced from the said movable member, a cam surface of varying diameter on the movable member, and a toroidal coil spring stretched around said cam surface in contact therewith and bearing against said stop member to exert a component of axial thrust on said movable member such as to yieldably resist movement of said movable member away from the other of said members, said contact being displaced from the center line of said spring in one direction only enabling said spring to roll on its axis on said cam surface as said movable member moves with respect to said other member.

9. An adjustable diameter belt pulley comprising a first, second and third circular members mounted on a common shaft for rotation, said second member being axially movable with respect to said first and third members, said first member having a stop surface facing said second member and normal to the axis of rotation of said shaft, a cam surface of varying diameter integrally formed on said second member and disposed in opposition to the stop surface on said first member, the cam surface having a smaller diameter thereof closer to said first member than a greater diameter thereof, a helical spring member circumferentially disposed between and in direct circular contact with the stop surface and the cam surface, said spring member exerting axial forces against the stop surface and radial and axial force components against said cam surface thereby forming a moment of rotation in said spring member about the circular contact on said cam surface, and said moment being a function of the diameter gradient at the circular contact on said cam surface.

10. The structure of claim 1 in which said opposed belt groove forming members comprise trunco-conical belt-engaging surfaces.

References Cited in the file of this patent

UNITED STATES PATENTS

| 1,966,780 | Wyrick | July 17, 1934 |
| 2,556,512 | Ammon | June 12, 1951 |
| 2,623,400 | Davis | Dec. 30, 1952 |

FOREIGN PATENTS

| 7,048 | Great Britain | 1914 |